United States Patent [19]
Randall

[11] Patent Number: 5,909,717
[45] Date of Patent: Jun. 8, 1999

[54] PORTABLE COLLAPSIBLE LIVESTOCK FEEDER

[76] Inventor: Jimmie K. Randall, P.O. Box 398, Richards, Tex. 77873

[21] Appl. No.: 08/959,251

[22] Filed: Oct. 28, 1997

[51] Int. Cl.[6] ...................................................... A01K 1/10
[52] U.S. Cl. .............................................................. 119/58
[58] Field of Search .................................. 119/58, 60, 61; 190/119

[56] References Cited

U.S. PATENT DOCUMENTS

| | | | |
|---|---|---|---|
| 406,511 | 7/1889 | Graham et al. | 119/61 |
| 727,925 | 5/1903 | Faulkner | 119/58 |
| 1,123,501 | 1/1915 | Dreibelbis | 119/60 |
| 1,553,834 | 9/1925 | Peterson . | |
| 3,362,382 | 1/1968 | Frasier | 119/58 |
| 3,738,324 | 6/1973 | Keen et al. | 119/61 |
| 4,457,264 | 7/1984 | Maier | 119/58 |
| 4,976,222 | 12/1990 | Cooke | 119/60 |
| 5,188,060 | 2/1993 | Johnson | 119/58 |
| 5,189,985 | 3/1993 | Brady et al. | 119/60 |
| 5,375,559 | 12/1994 | Baadsgaard | 119/58 |
| 5,509,377 | 4/1996 | Franklin | 119/60 |

Primary Examiner—Robert P. Swiatek
Attorney, Agent, or Firm—Kneeling Law Firm

[57] ABSTRACT

A portable collapsible livestock feeder comprising a rear panel hingedly attached to a lower container, and a restrainer fibrous feed attached to the rear panel. At least one hinge attaches the rear panel to the lower container. The rear panel is adjacent the lower container in a closed position, and is angularly related to the lower container in an open position. The feeder may be maintained in the open position. The feeder is maintained in the closed position by two L-shaped brackets which are rotatably mounted to the rear panel and which have a locking and a hanging position. In the locking position, the L-shaped brackets engage the lower container when the feeder is in the closed position. In the hanging position, the L-shaped brackets provide for hanging the feeder when the feeder is in the open position. In the preferred embodiment, the rear panel comprises an upper container.

20 Claims, 3 Drawing Sheets

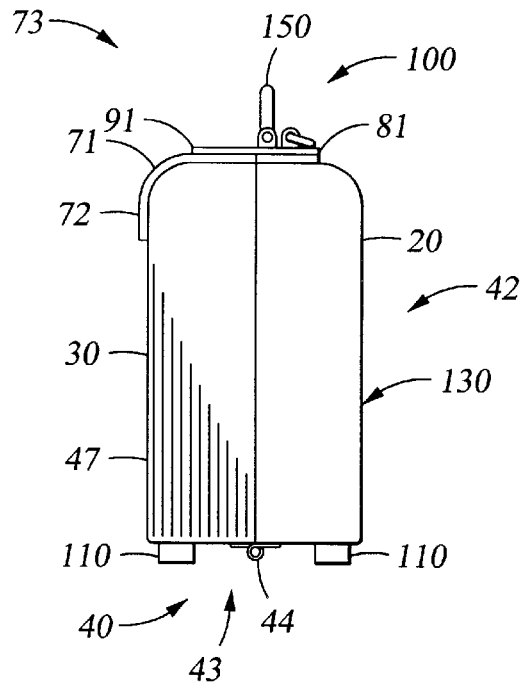
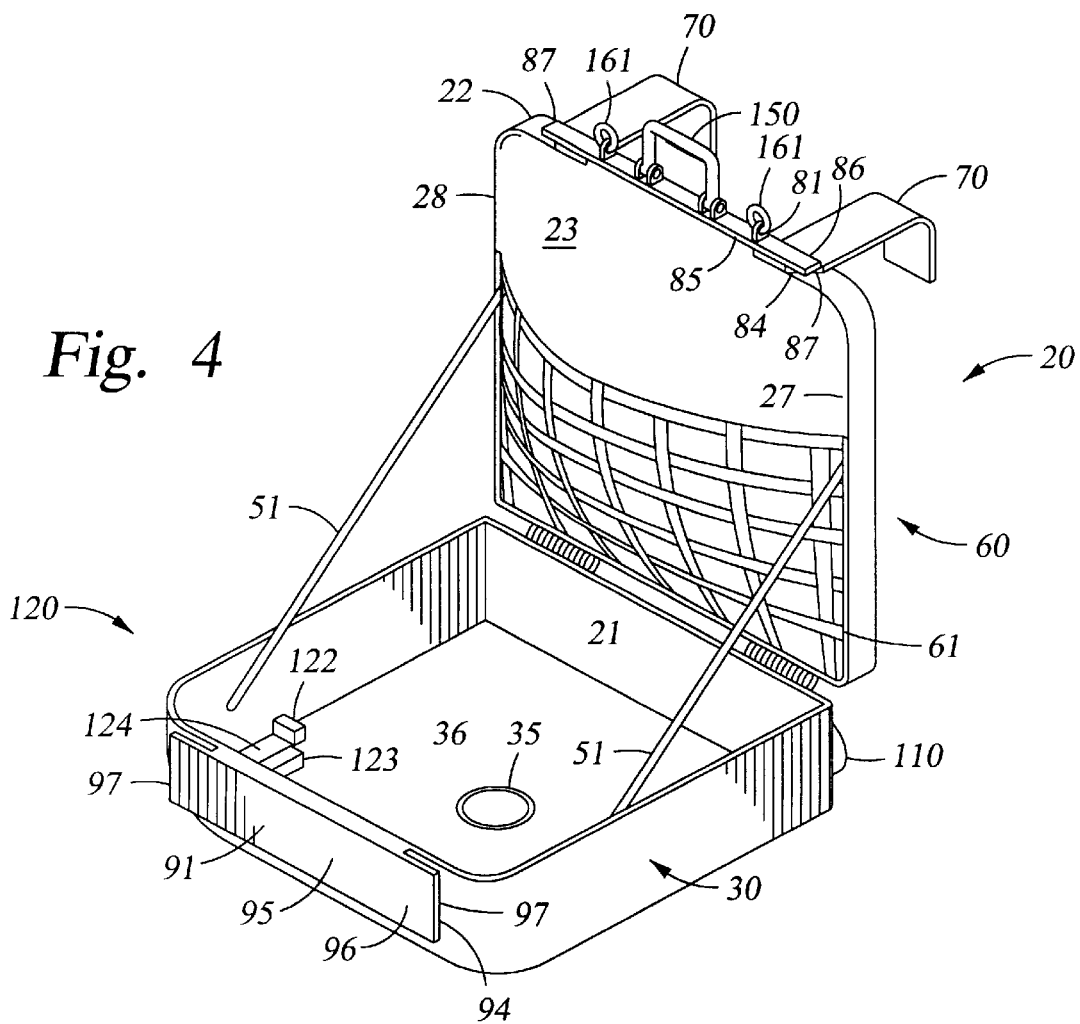

PORTABLE COLLAPSIBLE LIVESTOCK FEEDER

BACKGROUND OF THE INVENTION

1. Field of Invention

This invention relates to feeders for livestock. Specifically, this invention relates to livestock feeders for use in feeding various types of grains and fibrous feeds to livestock. The invention is easily transported (with or without the feeds therein) and is erected and disassembled by one person with minimal effort in minimal time.

Feeders have long been used in the care of livestock and are especially useful since they provide a method to monitor and regulate the amount of feed supplied and consumed by an animal. Control of the food supply during any period of time can be substantially beneficial to animals, especially horses. Horses have been known to consume great quantities of food in a short time period resulting in a life-threatening condition known as colic.

The types of food commonly consumed by livestock are grains and fibrous feeds. Feeders which have the capability of retaining both grain and fibrous feeds reduce the need for separate grain and fibrous feed feeders. Furthermore, the use of separate feeders for each animal prevents the transmission of illness at common feeding areas.

Feeders also prevent waste, spoilage, and contamination of food. Feed which falls to the ground can become contaminated by contacting animal waste or dirt. If unrestrained, livestock such as horses will compound the danger by scattering the feed across the ground. The ingestion by the animals of ground particles, including dirt and animal waste, can lead to severe illness or death. Thus, it is advantageous to include a means for restraining the feed within the feeder. Means of restraining fibrous feeds include grills or soft meshes through which the livestock can consume hay in limited amounts. Means of restraining grains include containers and pouches.

Feeders are usually permanently mounted in an animal's stall, barn, or corral. However, permanent feeders have several obvious drawbacks. Permanent feeders are difficult to clean, since the feeder must be cleaned where it is mounted. It is also difficult to relocate a permanent feeder when an animal's location is changed, or when additional animals are introduced into the area.

Additionally, some livestock are regularly transported to various locations, including horse shows, rodeos, and livestock shows or sales. These animals must be provided with suitable feeding facilities regardless of location. To quickly dispense feed, these feeding facilities must be rapidly erected. Assembly of the feeder wherever the animal is located must require few steps, have no loose parts that may be lost, and be completed in minimal time.

Collapsible feeders have been developed to provide both grain and fibrous feeds to animals. These feeders typically require cumbersome assembly and disassembly. Additionally, these feeders usually are permanently mounted and collapse when not in use. While trailer-mounted feeders are somewhat portable, such devices are useless if the animal is boarded in a stall or small corral where the trailer-mounted feeder cannot be located.

2. Related Art

Portable feeders are known to the prior art. Illustrative of such devices are U.S. Pat. No. 1,553,834, U.S. Pat. No. 3,362,382, U.S. Pat. No. 4,457,264, U.S. Pat. No. 4,976,222, U.S. Pat. No. 5,189,985, U.S. Pat. No. 5,375,559,and U.S. Pat. No. 5,509,377. None of these devices, however, provide a truly portable, collapsible feeder for grains and fibrous feeds which can be quickly and easily erected in any location.

SUMMARY OF THE INVENTION

Accordingly, the objectives of this invention are to provide, inter alia, a livestock feeder that:

incorporates feeders for both grain and fibrous feeds;

is collapsible;

is erected and struck with minimal effort in minimal time;

is portable;

collapses into a configuration which can be easily stored and transported; and contains no loose parts that may be lost.

Other objects of this invention will become apparent from time to time throughout the specification and claims as hereinafter related.

To achieve such improvements, the invention is a livestock feeder that includes a rear panel hingedly attached to a lower container and a means for restraining fibrous feed attached to the rear panel. At least one hinge attaches the rear panel to the lower container. The rear panel is adjacent the lower container in a closed position, and is angularly related to the lower container in an open position. A means is provided to maintain the feeder in the open position. The feeder is maintained in the closed position by two L-shaped brackets which are rotatably mounted on the rear panel and which have a locking and a hanging position. In the locking position, the L-shaped brackets engage the lower container when the feeder is in the closed position. In the hanging position, the L-shaped brackets provide a means for hanging the feeder when the feeder is in the open position. In the preferred embodiment, the rear panel comprises an upper container.

BRIEF DESCRIPTION OF THE DRAWINGS

The manner in which these objectives and other desirable characteristics can be obtained is explained in the following description and attached drawings in which:

FIG. 3 is a side view of the feeder.

FIG. 4 is a perspective view of the feeder in the open position including rear panel, webbing and salt lick enclosure.

DETAILED DESCRIPTION OF THE INVENTION

Figure 1:
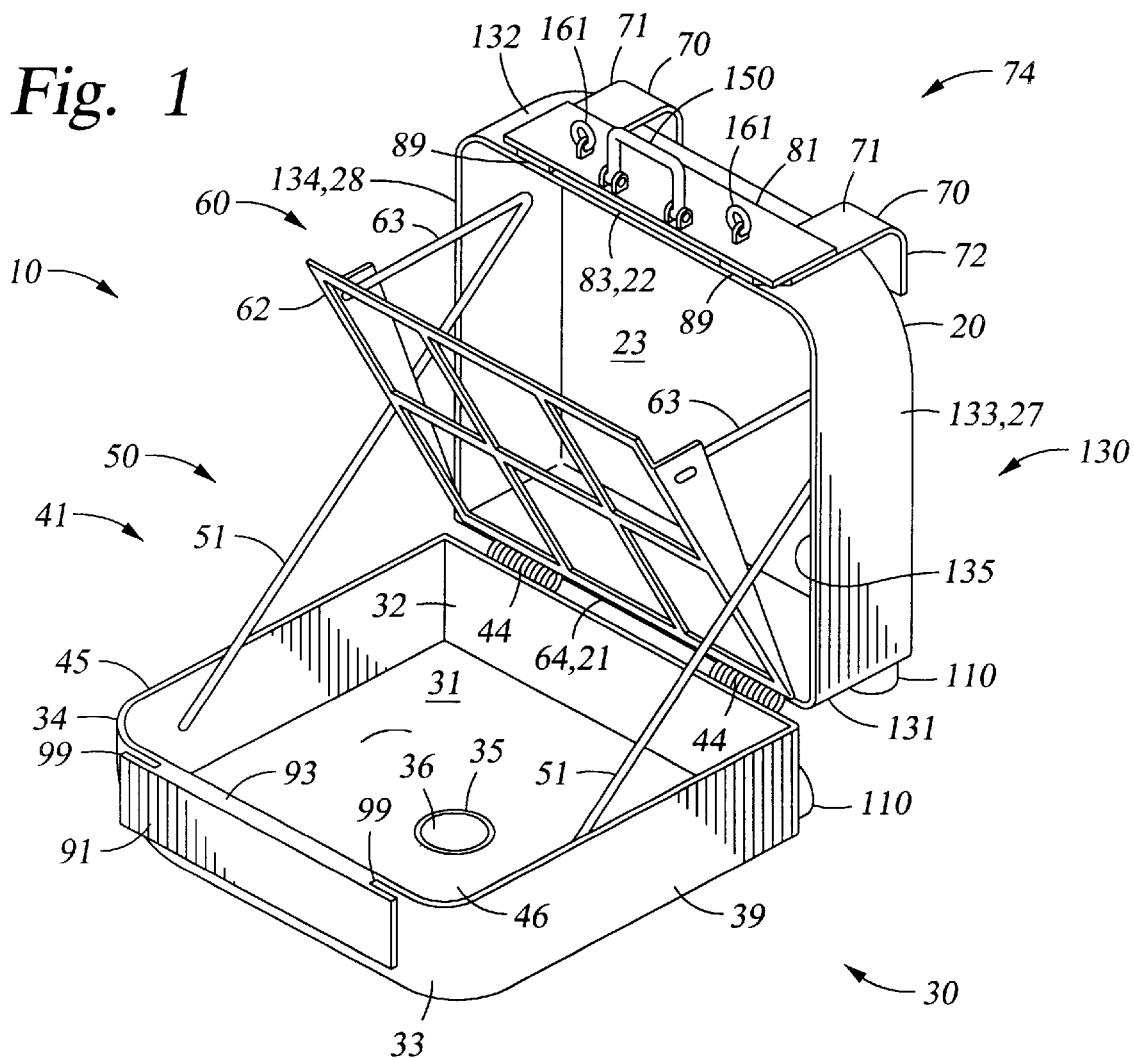
FIG. 1 is a perspective view of the feeder in the open position.

The preferred embodiment of my invention is illustrated in FIGS. 1 through 5 as 10. The feeder 10 comprises a rear panel 20, a lower container 30, a means for pivotally attaching 40 the rear panel 20 to the lower container 30, a means for maintaining 50 the feeder 10 in an open position 41, a means for restraining fibrous feeds 60, and at least one L-shaped bracket 70.

Figure 2:
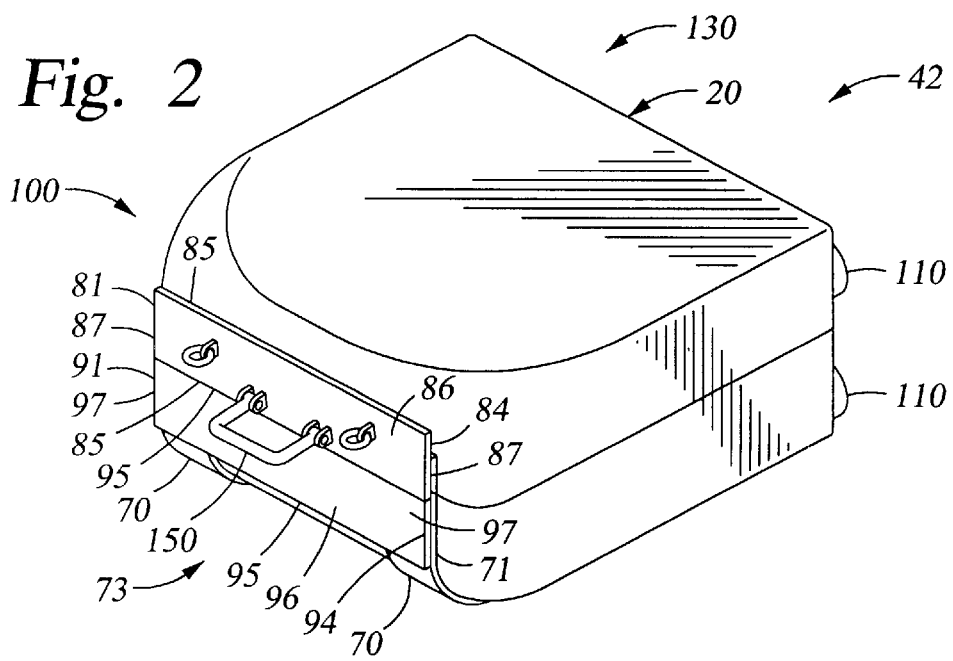
FIG. 2 is a perspective view of the feeder in the closed position.

As best shown in FIGS. 2 and 4, rear panel 20 is preferably substantially rectangular in shape and includes opposing first and second edges, 21 and 22, opposing third and fourth edges, 27 and 28, and an rear panel inner face 23.

Rear panel 20 is preferably constructed from a rigid material, such as a resin-based or a metal material.

In a preferred embodiment, as shown in FIGS. 1–3, and 5, rear panel 20 includes sides extending perpendicularly from the edges, 21, 22, 27, and 28, of the rear panel inner face 23 thus defining an upper container 130. Upper container 130 therefore includes opposing first and second sides, 131 and 132, and opposing third and fourth sides, 133 and 134. Upper container 130 defines a cavity 136 therein. In addition, upper container 130 includes an upper container top surface 135 which corresponds to the end of the upper container sides, 131, 132, 133, and 134, which is distal from rear panel inner face 23.

In another preferred embodiment, rear panel 20 comprises a metal hoop and a pouch, constructed from a rigid material, attached to said hoop (not shown in the Figures).

Lower container 30 includes opposing first and second sides, 32 and 33, opposing third and fourth sides, 39 and 45, a lower container face 31, and a bottom 47. Lower container 30 defines a lower container cavity 46. The cross-section of lower container 30 is preferably substantially rectangular in shape. In addition, lower container 30 includes a lower container top surface 34 which corresponds to the end of the lower container sides, 32, 33, 39, and 45, which is distal from lower container face 31. Lower container 30 is preferably constructed from a rigid material, such as a resin-based or a metal material, and is rectangular in shape.

In a preferred embodiment, lower container 30 includes a hole 35 in and through the lower container face 31. This embodiment also includes a plug 36 sized to be removably inserted in said hole 35.

In another preferred embodiment, lower container 30 comprises a metal hoop and a pouch, constructed from a rigid material, attached to said hoop (not shown in the Figures).

In the preferred embodiment, the cross-sections of rear panel 20 and lower container 30 are substantially the same size and shape. Thus, when rear panel 20 and lower container 30 are placed side to side, the entire length of lower container top surface 34 abuts the entire length of upper container top surface 135.

Means for pivotally attaching 40 attaches the rear panel 20 to the lower container 30. In the preferred embodiment as shown in FIG. 4, means for pivotally attaching 40 attaches the lower container top surface 34 of the lower container first side 32 to the first edge 21 of the rear panel 20. Preferably, means for pivotally attaching 40 comprises a means for hingedly attaching 43 the rear panel 20 to the lower container 30. In the preferred embodiment, means for hingedly attaching 43 comprises at least one hinge 44, commonly known in the art, attaching the lower container top surface 34 of the lower container first side 32 to the first edge 21 of the rear panel 20.

In the preferred embodiment including upper container 130 as best shown in FIG. 1, means for pivotally attaching 40 (which comprises at least one hinge 44 in the preferred embodiment) attaches the lower container top surface 34 of the lower container first side 32 to the upper container top surface 135 of the upper container first side 131.

It is preferred that means for hingedly attaching 43 comprises two hinges 44. The two hinges 44 are attached along and to the lower container first side 32 and the rear panel first edge 21 (or the upper container first side 131 in the preferred embodiment) in a symmetric pattern.

Means for pivotally attaching 40 enables the rear panel 20 (or upper container 130 in the preferred embodiment) and the lower container 30 to move, relative to each other, between an open position 41 (shown in FIGS. 1, 4, and 5) and a closed position 42 (shown in FIGS. 2 and 3). In the open position 41, the lower container 30 and the rear panel 20 (or upper container 130 in the preferred embodiment) are pivoted about the means for pivotally attaching 40 (at least one hinge 44 in the preferred embodiment) so that the lower container 30 and the rear panel 20 (or upper container 130 in the preferred embodiment) are angularly related. In the closed position 42, the lower container 30 and the rear panel 20 (or upper container 130 in the preferred embodiment) are pivoted about the means for pivotally attaching 40 (at least one hinge 44 in the preferred embodiment) so that the lower container 30 and the rear panel 20 (or upper container 130 in the preferred embodiment) abut along their entire perimeters, as previously disclosed.

Means for maintaining 50 feeder 10 in open position 41 maintains the angular relation between the lower container 30 and the rear panel 20 (or upper container 130 in the preferred embodiment) when the feeder is in the open position 41. In the preferred embodiment, means for maintaining 50 comprises at least one cord 51 having two ends. One end of at least one cord 51 is attached to the rear panel 20 (or upper container 130 in the preferred embodiment). The other end of at least one cord 51 is attached to the lower container 30. In the preferred embodiment, the length of at least one cord 51 is such that at least one cord 51 becomes taut at an angular relation of approximately 90 degrees between the rear panel 20 (or upper container 130 in the preferred embodiment) and the lower container 30. Thus, when feeder 10 is in the open position 41, at least one cord 51 maintains the relative angular relation of rear panel 20 (or upper container 130 in the preferred embodiment) and lower container 30 at approximately 90 degrees.

In the preferred embodiment, means for maintaining 50 comprises two cords 51, each having two ends. One of the two cords 51 attaches the third side 39 of lower container 30 to the third edge 27 of rear panel 20 (or the upper container third side 133 in the preferred embodiment). The other of the two cords 51 attaches the fourth side 45 of lower container 30 to the fourth edge 28 of rear panel 20 (or the upper container fourth side 134 in the preferred embodiment).

Means for restraining 60 fibrous feeds restrains fibrous feeds within the feeder 10 so that fibrous feeds do not fall to the ground when the animal is feeding. In a preferred embodiment as shown in FIG. 4, means for restraining comprises a webbing 61 attached to the rear panel inner face 23 of rear panel 20 (or the upper container 130 in the preferred embodiment). In addition, webbing 61 is constructed from a flexible durable material, such as a resin-based or a fibrous material.

Figure 5:
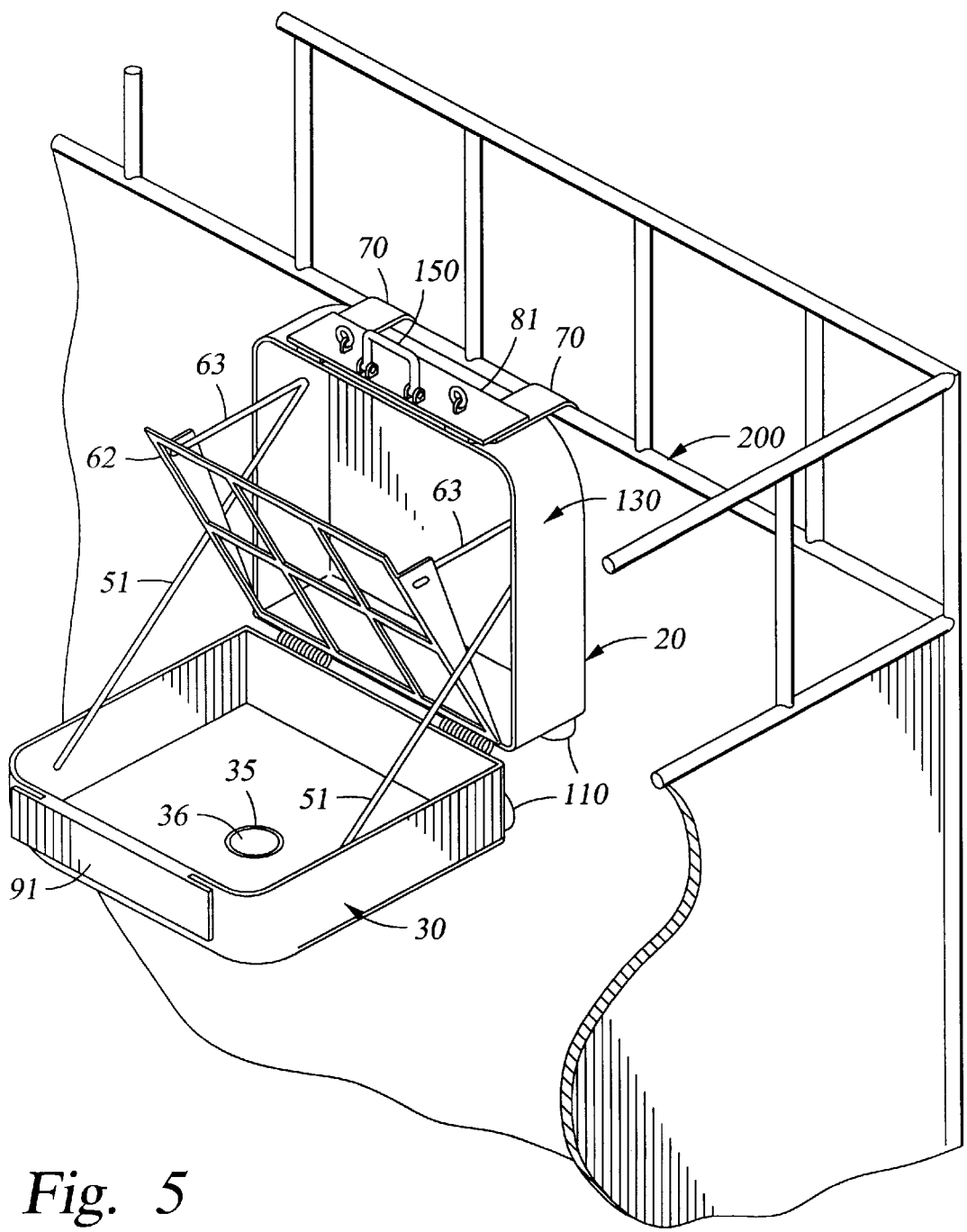
FIG. 5 is a perspective view of the feeder removably attached to a stall enclosure.

In another preferred embodiment as shown in FIGS. 1 and 5, means for restraining 60 comprises a lattice 62 attached to the rear panel inner face 23 of rear panel 20 by way of at least one strip 63. Thus, the cross-section of lattice 62 may not be larger than the rear panel inner face 23. In addition, lattice 62, is constructed from a rigid material, such as a resin-based or a metal material.

In this embodiment, lattice 62 is also connected to at least one hinge 44. Preferably, the bottom 64 of lattice 62 is integral with at least one hinge 44 thus also enabling the lattice 62 to pivot about means for pivotally attaching 40 (which preferably comprises two hinges 44).

At least one strip 63, in turn, attaches the rear panel 20 (or upper container 130 in the preferred embodiment) to the lattice 62. Preferably, two strips 63 are included. One strip 63 is attached at one end to the fourth edge 28 of rear panel 20 (or the upper container fourth side 134 in the preferred embodiment) and at the other end to the corresponding end of lattice 62. The other strip 63 is attached at one end to the third edge 27 of rear panel 20 (or the upper container third side 133 in the preferred embodiment) and at its other end to the corresponding end of lattice 62.

The strips 63 may be constructed from any flexible or resilient material. Preferably, the length of the strips 63 is such that, when the feeder 10 is in the open position 41, the lattice 62 is angularly displaced from the rear panel 20 (or the upper container 130 in the preferred embodiment) and is maintained in such angular displacement by the strips 63. It is understood as previously disclosed that lattice 62 pivots about means for pivotally attaching 40.

When feeder 10 is in the open position 41, the rear panel 20 (or the upper container 130 in the preferred embodiment), the lower container 30, and the lattice 62 should be angularly related so that lattice 62 is intermediate rear panel 20 (or the upper container 130 in the preferred embodiment) and lower container 30.

The feeder 10 also includes a rear panel segment 81 and a lower container segment 91. Both segments, 81 and 91, are rectangular in shape. Preferably the segments of rear panel segment 81 and lower container segment 91 have uniform width. In addition, both segments, 81 and 91, are constructed from a rigid material, such as a resin-based or a metal material.

As best shown in FIGS. 2 and 5, rear panel segment 81 includes two first opposing long sides 85 and two first opposing short sides 87. In addition, rear panel segment 81 includes a first rear panel segment face 84 and a second rear panel segment face 86. First rear panel segment face 84 is adjacent rear panel 20 (or the upper container second side 132 in the preferred embodiment). Second rear panel segment face 86 is distal to rear panel 20 (or the upper container 132 in the preferred embodiment.

Likewise, lower container segment 91 includes two second opposing long sides 95 and two second opposing short sides 97. Lower container segment 91 includes a first lower container segment face 94 and a second lower container segment face 96. First lower container segment face 94 is adjacent lower container 30. Second lower container segment face 96 is distal lower container 30.

Rear panel segment 81 is attached to the second edge 22 of rear panel 20 (or the upper container second side 132 in the preferred embodiment) by way of rear joint 83. Rear panel joint 83 is attached at one of its ends to the second edge 22 of rear panel 20 (or the upper container second side 132 adjacent upper container top surface 135 in the preferred embodiment) and extends towards its other end in a direction distal to the first edge 21 of rear panel 20 (or the upper container first side 131 in the preferred embodiment). Preferably, rear panel joint 83 extends from the second edge 22 of rear panel 20 (or upper container side 132 in the preferred embodiment) in a direction parallel to rear panel inner face 23 (or perpendicular to upper container second side 132 in the preferred embodiment).

At its other end, rear panel joint 83 is attached to one of the two opposing long sides 85 of rear panel segment 81. Preferably, from its connection with rear panel joint 83, rear panel segment 81 extends in the direction distal from lower container 30 (when feeder 10 is in the closed position 42). The length of rear panel joint 83, however, does not extend the entire length of the corresponding opposing side 85 of rear panel segment 81 to which it is attached. In addition, rear panel segment 81 is substantially centered on rear panel joint 83. Thus, a clearance 89 is defined between the attached opposing long side 85 and the second edge 22 of rear panel 20 (or upper container second side 132 in the preferred embodiment) at each end of the attached opposing long side 85.

In addition, rear panel segment 81 and rear panel joint 83 are preferably attached so that first rear panel segment face 84 is parallel to second edge 22 (or upper container second side 132 in the preferred embodiment) and is perpendicular to rear panel inner face 23. Thus, each clearance 89 between the rear panel segment 81 and the second edge 22 of rear panel 20 (or upper container second side 132 in the preferred embodiment) is uniform in length throughout the dimensions of rear panel segment 81.

Lower container segment 91 is attached to the second side 33 of lower container 30 by way of lower container joint 93. Lower container joint 93 is attached at one of its ends to the second side 33 of lower container 30 and extends towards its other end in a direction distal to the first side 32 of lower container 30. Preferably, lower container joint 93 extends from the second side 33 of lower container 30 in a direction parallel to lower container face 31.

At its other end, lower container joint 93 is attached to one of the two opposing long sides 95 of lower container segment 91. Preferably, from its connection with lower container joint 93, lower container segment 91 extends in the direction distal from rear panel 20 (when feeder 10 is in the closed position 42). The length of lower container joint 93, however, does not extend the entire length of the corresponding opposing side 95 to which it is attached. In addition, lower container segment 91 is substantially centered on lower container joint 93. Thus, a clearance 99 is defined between the attached opposing long side 95 of lower container segment 91 and the second side 33 of lower container 30 at each end of the attached opposing long side 95.

In addition, lower container segment 91 and lower container joint 93 are preferably attached so that lower container segment face 94 is parallel to second side 33 and is perpendicular to lower container face 31. Thus, each clearance 99 between the lower container segment 91 and the second side 33 of lower container 30 is uniform in length throughout the dimensions of lower container segment 91.

The feeder 10 also includes at least one L-shaped bracket 70. At least one L-shaped bracket 70 is rotatably mounted adjacent the second edge 22 of rear panel 20, preferably to rear panel segment 81 (on first rear panel segment face 84). In the preferred embodiment including upper container 130, at least one L-shaped bracket 70 is preferably rotatably mounted on the upper container second side 132. In addition, at least one L-shaped bracket 70 is constructed from a rigid material, such as a resin-based or a metal material.

At least one L-shaped bracket 70 includes two parts which are analogous to the two sections of the letter "L": a first part 71 (the vertical section of the letter "L") and a second part 72 (the horizontal section of the letter "L"). Bracket first part 71 and bracket second part 72 are attached to form the "L" shape. Preferably, bracket first part 71 and bracket second part 72 comprise one integral piece.

Preferably, bracket first part 71 is disposed and connected to rear panel segment 81 or upper container second side 132 within the clearance 89 formed between rear panel segment 81 and the second edge 22 of rear panel 20 (or upper container second side 132 in the preferred embodiment).

Bracket second part 72 is disposed so that it extends in the direction of the rear panel inner face 23.

In the embodiment not including upper container 132, bracket first part 71 is rotatably mounted adjacent the second edge 22 of rear panel 20, preferably to rear panel segment 81 (on first rear panel segment face 84). In the preferred embodiment including upper container 130, bracket first part 71 is rotatably mounted on and attached to the upper container second side 132. Bracket first part 71 is also preferably perpendicular to rear panel inner face 23.

Preferably, bracket first part 71 is rotatably mounted on and attached to rear panel segment 81 (or upper container second side 132 in the preferred embodiment) by way of a commonly known rotation mount mechanism, such as a hole and a pin. The rotation mount mechanism allows for rotation of at least one L-shaped bracket 70 relative to rear panel 20 (or upper container 130).

With bracket first part 71 disposed within clearance 89, it is essential that bracket first part 71 be long enough to allow rotation of at least one L-shaped bracket 70 around the third or fourth edge, 27 or 28, of rear panel 20 (depending on which clearance 89 bracket first part 71 is disposed within). In the preferred embodiment including upper container 130, bracket first part 71 must be long enough to allow rotation of at least one L-shaped bracket 70 around the upper container third or fourth sides, 133 or 134 (depending on which clearance 89 bracket first part 71 is disposed within). It is also essential that bracket first part 71 is long enough to allow rotation of at least one L-shaped bracket 70 around lower container 30 when the feeder 10 is in the closed position 42. Thus, bracket first part 71 and the positioning of the rotatable attachment of at least one L-shaped bracket 70 to rear panel segment 81 (or upper container 130 in the preferred embodiment) must be such that, as at least one L-shaped bracket 70 is rotated about its pivot point when feeder 10 is in the closed position 42, bracket second part 72 does not impact any section of the rear panel 20 or any section of the lower container 30.

The rotation of at least one L-shaped bracket 70 relative to rear panel 20 (or upper container 130 in the preferred embodiment) defines two positions of at least one L-shaped bracket 70: a locking position 73 (shown in FIGS. 2 and 3) and a hanging position 74 (shown in FIGS. 1, 4, and 5). In the locking position 73, at least one L-shaped bracket 70 is rotated relative to rear panel 20 (or upper container 130 in the preferred embodiment) so that bracket second part 72 is adjacent lower container 30. In the hanging position 74, at least one L-shaped bracket 70 is rotated relative to rear panel 20 (or upper container 130 in the preferred embodiment) so that bracket second part 72 is distal lower container 30.

At least one L-shaped bracket 70 together with rear panel segment 81 and lower container segment 91 also serve as a locking mechanism 100 for feeder 10 when feeder 10 is in the closed position 42 and when at least one L-shaped bracket 70 is in the locking position 73. When feeder 10 is in the closed position 42, the lower container 30 and the rear panel 20 (or upper container 130 in the preferred embodiment) are pivoted about the means for pivotally attaching 40 (at least one hinge 44 in the preferred embodiment) so that the lower container 30 and the rear panel 20 (or upper container 130 in the preferred embodiment) abut along their entire perimeters, as previously disclosed.

As at least one L-shaped bracket 70 is rotated about its pivot within clearance 89, bracket short part 72 rotates around the relevant sections of rear panel 20 (or upper container 130) and the relevant sections of lower container 30. Once bracket second part 72 has rotated around the side of lower container 30, bracket first part 71 is then inserted into the clearance 99 between the lower container segment 91 and the lower container second side 33, thereby defining the locking position 73. Thus, in the locking position 73, at least one L-shaped bracket 70 is bound within clearances, 89 and 99, and bracket first part 71 abuts first rear panel segment face 84 as well as first lower container segment face 94. In the preferred embodiment, once at least one L-shaped bracket 70 is fully rotated into the locking position 73 and is within clearance 99, bracket second side 72 substantially abuts the bottom 47 of lower container 30. Thus, at least one L-shaped bracket 70, bracket first part 71, and the positioning of the rotatable attachment of at least one L-shaped bracket 70 to rear panel 20 (or upper container 130 in the preferred embodiment) are preferably sized and constructed to provide such substantial abutment.

The preferred embodiment discloses two L-shaped brackets 70. Each L-shaped bracket 70 is rotatably attached to rear panel segment 81 of rear panel 20 (or the upper container first side 131) as previously disclosed. One of the L-shaped brackets 70 is attached within the clearance 89 adjacent the fourth edge 28 of rear panel 20 (or the upper container fourth side 134 in the preferred embodiment), while the other L-shaped bracket 70 is attached within the clearance 89 adjacent the third edge 27 of rear panel 20 (or the upper container third side 133 in the preferred embodiment). When the feeder 10 is in the closed position 42, each of the two L-shaped brackets 70 may be placed in the locking position 73 by rotating each around the corresponding sides or edges of lower container 30 and rear panel 20 (or upper container 130 in the preferred embodiment) and by inserting each into the corresponding clearance 99.

In the preferred embodiment, the feeder 10 also includes at least one foot 110 attached to the first side 32 of lower container 30 and at least one foot 110 attached to the upper container first side 131 (in the preferred embodiment). At least one foot 110 has a circular cross-section and a height. Preferably, two feet 110 are attached to the first side 32 of lower container 30, one foot 110 at either end of the first side 32. Also preferably, two feet 110 are attached to the first edge 21 of the upper container first side 131 (in the preferred embodiment), one foot 110 at either end of the upper container first side 131. In an alternative embodiment, at least one foot 110 has a rectangular cross-section.

One embodiment of the feeder 10 also includes a means for attaching a salt lick 120 to the lower container 30. In the preferred embodiment, means for attaching salt lick 120 comprises a first rib 122 attached to lower container face 31 and a second rib 123 also attached to lower container face 31. Second rib 123 is attached adjacent and perpendicular to first rib 122; thus, first and second ribs, 122 and 123, form enclosure 124. A salt lick is then placed in the enclosure 124.

A preferred embodiment of the invention also includes a handle 150 attached to the feeder 10. Preferably, handle 150 is attached to the rear panel segment 81 on the second rear panel segment face 86.

One embodiment of the invention also includes means for tying fibrous strap to said rear panel 20 preferably adjacent to rear panel second edge 22. In the preferred embodiment, means for tying strap to said rear panel 20 comprises at least two rings 161 attached to the rear panel segment 81 on the second rear panel segment face 86.

IN OPERATION

In operation, when the feeder 10 is in the closed position 42 and the L-shaped brackets 70 are in the locking position 73, a user may grab the feeder 10 by its handle 150 and easily carry the feeder 10, like a suitcase, to any location. Thus, a user may transport the feeder 10 to shows or rodeos.

Once a user is ready to feed the livestock, the L-shaped brackets 70 are pivoted from their locking position 73 to their hanging position 74 and feeder 10 is moved to its open position 41. With the lower container 30 disposed at substantially a 90 degree angle from the rear panel 20 (or upper container 130 in the preferred embodiment) and maintained as such by means for maintaining 50 and with the L-shaped brackets 70 in their open position 74, the feeder 10 is hung on any horizontal surface thin and long enough to be inserted between the bracket second part 72 and the rear panel 20 (or upper container 130 in the preferred embodiment). Adequate surfaces may include gates 200, fences, and many horizontal bars or posts. If an adequate horizontal surface cannot be found, feeder 10 can be suspended by fibrous cord to any vertical surface using rings 161.

After the feeder 10 is adequately secured, a user may place grain in the cavity 46 of lower container 30 and fibrous feed between the webbing 61 or lattice 62 (depending on the embodiment of the means for restraining 60) and the rear panel inner face 23. The fibrous feed will be accessible to the animal through the holes of the webbing 61 or lattice 62. If a user wishes to also provide a salt lick for feeding, the user may simply deposit the salt lick in enclosure 124.

Once the animal has finished feeding, a user may wish to clean the feeder 10. To aid in the cleaning process, a user may disengage plug 36 from hole 35 on lower container face 31 thereby providing an outlet for any waste.

Once the user has finished utilizing the feeder 10, the feeder 10 is removed. The user then moves the feeder 10 into the closed position 42 and moves the L-shaped brackets 70 into their locking position 73. The feeder 10 is now once again ready for transportation. It is noted that the feeder 10 may be closed and transported while containing feed.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A portable and collapsible livestock feeder of grains and fibrous feed, comprising:

a rear panel having opposing first and second edges and an inner face;

a lower container having a first side and a top surface;

a means for pivotally attaching said lower container top surface of said lower container first side to said rear panel first edge, thereby defining a closed position when said lower container and said rear panel are pivoted so that said lower container top surface abuts said rear panel inner face, and thereby defining an open position when said lower container and said rear panel are pivoted so that said lower container is angularly related to said rear panel;

at least one L-shaped bracket being rotatably mounted to said rear panel adjacent said second edge, thereby defining a first position when each of said at least one L-shaped bracket is rotated to be proximate said lower container, and thereby defining a second position when each of said at least one L-shaped bracket is rotated to be distal said lower container; and each of said at least one L-shaped bracket sized and constructed so that when said feeder is in said closed position said bracket freely rotates and does not impact said rear panel or said lower container when said bracket is moved to and from said first and second positions.

2. A portable and collapsible livestock feeder as claimed in claim 1, wherein:

each of said at least one L-shaped bracket comprising a bracket first part and a bracket second part;

said bracket first part being rotatably mounted to said rear panel adjacent said second edge, being perpendicular to said rear panel inner face;

said bracket second part extending from said bracket first part in a direction towards said rear panel first edge; and thereby defining said first position when each of said at least one L-shaped bracket is rotated so that said bracket second part is proximate said lower container, and thereby defining said second position when each of said at least one L-shaped bracket is rotated so that said bracket second part is distal said lower container.

3. A portable and collapsible livestock feeder as claimed in claim 2, wherein said at least one L-shaped bracket comprising two L-shaped brackets.

4. A portable and collapsible livestock feeder as claimed in claim 3, further comprising:

a lower container segment and a lower container joint;

said lower container further comprising a lower container second side opposing said lower container first side;

said lower container further comprising a lower container face disposed between said lower container first side and said lower container second side and proximate said rear panel;

said lower container joint attached at one end to said lower container second side adjacent said lower container top surface;

said lower container joint attached at its other end to said lower container segment;

said lower container joint extending from said lower container second side in a direction distal to said lower container first side and parallel to said lower container face;

said lower container segment extending from said lower container joint in a direction distal to said rear panel and perpendicular to said lower container face;

said lower container segment having a length;

said lower container joint having a length;

said lower container joint length being smaller than said lower container segment length thereby defining a clearance between said lower container segment and said lower container second side at each end of said lower container joint length; and each of said two lower container clearances sized to receive one of said two bracket first parts when said brackets are in said first position and when said feeder is in said closed position.

5. A portable and collapsible livestock feeder as claimed in claim 4, further comprising:

a rear panel segment and a rear panel joint;

said rear panel joint attached at one end to said rear panel second edge;

said rear panel joint attached at its other end to said rear panel segment;

said rear panel joint extending from said rear panel second edge in a direction distal to said rear panel first edge and parallel to said rear panel inner face;

said rear panel segment extending from said rear panel joint in a direction distal to said lower container and perpendicular to said rear panel inner face;

said rear panel segment having a length;

said rear panel joint having a length;

said rear panel joint length being smaller than said rear panel segment length thereby defining a clearance between said rear panel segment and said rear panel second edge at each end of said rear panel joint length; and one of said two bracket first parts rotatably attached to said rear panel segment within each of said rear panel clearances.

6. A portable and collapsible livestock feeder as claimed in claim 4, wherein:

said rear panel comprising an upper container;

said upper container having a first side and a top surface;

said means for pivotally attaching attaching said lower container top surface of said lower container first side to said upper container top surface of said upper container first side, thereby defining said closed position when said lower container and said upper container are pivoted so that said lower container top surface abuts said upper container top surface, and thereby defining said open position when said lower container and said upper container are pivoted so that said lower container is angularly related to said upper container; and said two L-shaped brackets being rotatably mounted to said upper container second side, thereby defining said first position when each of said two L-shaped brackets are rotated so that said bracket second parts are proximate said lower container, and thereby defining said second position when each of said two L-shaped brackets are rotated so that said bracket second parts are distal said lower container.

7. A portable and collapsible livestock feeder as claimed in claim 6, further comprising:

a rear panel segment and a rear panel joint;

said upper container further comprising an upper container second side opposing said upper container first side;

said rear panel joint attached at one end to said upper container second side adjacent said upper container top surface;

said rear panel joint attached at its other end to said rear panel segment;

said rear panel joint extending from said upper container second side in a direction distal to said upper container first side and parallel to said rear panel inner face;

said rear panel segment extending from said rear panel joint in a direction distal to said lower container and perpendicular to said rear panel inner face;

said rear panel segment having a length;

said rear panel joint having a length;

said rear panel joint length being smaller than said rear panel segment length thereby defining a clearance between said rear panel segment and said upper container second side at each end of said rear panel joint length; and one of said two bracket first parts rotatably attached to said rear panel segment within each of said rear panel clearances.

8. A portable and collapsible livestock feeder as claimed in claim 7, wherein:

said lower container further comprising a lower container bottom located opposite to said lower container face; and each of said two brackets sized, constructed and attached to said rear panel segment so that said bracket second part substantially abuts said lower container bottom when said bracket is in a locking position.

9. A portable and collapsible livestock feeder as claimed in claim 1, wherein:

said means for pivotally attaching comprising a means for hingedly attaching said lower container top surface of said lower container first side to said rear panel first edge.

10. A portable and collapsible livestock feeder as claimed in claim 9, wherein:

said means for hingedly attaching comprising two hinges; and said two hinges disposed along said rear panel first edge and said lower container top surface.

11. A portable and collapsible livestock feeder as claimed in claim 10, further comprising:

a means for maintaining said feeder in said open position; and said means for maintaining maintaining said lower container and said rear panel displaced at an angular relation of approximately 90 degrees when said feeder is in said open position.

12. A portable and collapsible livestock feeder as claimed in claim 11, wherein:

said means for maintaining comprising at least one cord;

each of said at least one cord attached at one end to said rear panel;

each of said at least one cord attached at its other end to said lower container;

each of said at least one cord having a length; and said at least one cord length sized so that said at least one cord becomes taut when said lower container and said rear panel are displaced at an angular relation of approximately 90 degrees when said feeder is in said open position.

13. A portable and collapsible livestock feeder as claimed in claim 12, further comprising:

a means for restraining fibrous feeds.

14. A portable and collapsible livestock feeder as claimed in claim 13, wherein:

said means for restraining fibrous feeds comprising a webbing; and said webbing attached to said rear panel inner face.

15. A portable and collapsible livestock feeder as claimed in claim 13, wherein:

said means for restraining fibrous feeds comprising a lattice and at least one strip;

each of said at least one strip attached at one end to said lattice;

each of said at least one strip attached at its other end to said rear panel;

said lattice having a bottom;

said lattice bottom connected to said means for pivotally attaching thereby also enabling said lattice to pivot about said means for pivotally attaching;

each of said at least one strip having a length; and said at least one strip length sized so that when said feeder is in said open position, said at least one strip becomes taut when said lattice is angularly displaced in a position intermediate to said rear panel and said lower container.

16. A portable and collapsible livestock feeder as claimed in claim 13, wherein:

said lower container her having a hole extending therethrough; and a plug removably insertable in said lower container hole.

17. A portable and collapsible livestock feeder as claimed in claim 16, further comprising a handle attached to said rear panel adjacent to said rear panel second edge.

18. A portable and collapsible livestock feeder as claimed in claim 17, further comprising a means for attaching a salt lick.

19. A portable and collapsible livestock feeder as claimed in claim 18, wherein:

said means for attaching a salt lick comprising a first and second rib;

said first rib attached to said lower container;

said second rib attached to said lower container adjacent and perpendicular to said first rib; and thereby defining an enclosure wherein a salt lick may be placed.

20. A portable and collapsible livestock feeder as claimed in claim 19, further comprising a means for tying strap to said rear panel;

said means for tying strap to said rear panel comprising at least two rings; and each of said rings attached to said rear panel adjacent said rear panel second edge.

* * * * *